United States Patent [19]
Lee

[11] Patent Number: 5,810,226
[45] Date of Patent: Sep. 22, 1998

[54] STANDOFF ASSEMBLY FOR A AUTOMOBILE SPORTS RACK

[76] Inventor: Douglas Lee, 8957 Sepulveda Blvd., Sepulveda, Calif. 91343

[21] Appl. No.: 641,755

[22] Filed: May 2, 1996

Related U.S. Application Data

[62] Division of Ser. No. 549,067, Oct. 27, 1995, Pat. No. 3,353,930, which is a division of Ser. No. 196,566, Feb. 14, 1994, Pat. No. 5,499,762, which is a division of Ser. No. 45,468, Apr. 8, 1993, Pat. No. 5,314,104, which is a continuation-in-part of Ser. No. 765,667, Sep. 26, 1991, Pat. No. 5,201,911.

[51] Int. Cl.[6] .................................................... B60R 9/00
[52] U.S. Cl. ........................................... 224/321; 224/309
[58] Field of Search .................................. 224/321, 309, 224/322, 323, 325, 326, 327

[56] References Cited

U.S. PATENT DOCUMENTS

| | | | |
|---|---|---|---|
| 3,064,868 | 11/1962 | Treydte | 224/330 |
| 3,724,730 | 4/1973 | Olsen et al. | 224/327 |
| 4,099,658 | 7/1978 | Bott | 224/42.1 F |
| 4,132,335 | 1/1979 | Ingrom | 224/42.01 F |
| 4,239,139 | 12/1980 | Bott | 224/324 |
| 4,245,764 | 1/1981 | Kowalski | 224/321 |
| 4,261,496 | 4/1981 | Mareydt et al. | 224/315 |
| 4,372,469 | 2/1983 | Kowalski et al. | 224/321 |
| 4,473,178 | 9/1984 | Bott | 224/324 |
| 4,516,709 | 5/1985 | Bott | 224/315 |
| 4,588,117 | 5/1986 | Bott | 224/321 |
| 4,640,450 | 2/1987 | Gallion et al. | 224/331 |
| 4,757,929 | 7/1988 | Nelson | 224/320 |
| 4,770,329 | 9/1988 | Kamaya | 224/315 |
| 4,877,169 | 10/1989 | Grim | 224/331 |
| 4,911,348 | 3/1990 | Rasor et al. | 224/321 |
| 4,982,886 | 1/1991 | Cucheran | 224/321 |
| 5,014,893 | 5/1991 | Morley et al. | 224/321 |
| 5,275,320 | 1/1994 | Duemmler | 224/321 |
| 5,320,264 | 6/1994 | Weir | 224/321 |
| 5,474,217 | 12/1995 | Mandarino et al. | 224/321 |

FOREIGN PATENT DOCUMENTS

| | | |
|---|---|---|
| 0079318 | 5/1983 | European Pat. Off. . |
| 0325876 | 8/1989 | European Pat. Off. . |

OTHER PUBLICATIONS

Thule 38 Product Packaging –No Date.
Letter from counsel for Yakima Products, Inc. with attachments: Yakima pictures and Yakima Product Brochure. Jul. 1994.
Yakima Racks Product Brochure –No Date.
Yakima Rack Pictures –No Date.

*Primary Examiner*—David J. Walczak
*Attorney, Agent, or Firm*—Fitzpatrick, Cella, Harper & Scinto

[57] ABSTRACT

A standoff assembly, adapted to mount a sports rack crossbar onto a vehicle roof-rail having an inner groove extending substantially along the length thereof, includes a standoff having a base portion and a rack portion fixed in a spaced apart relationship by an intermediate portion disposed between a rack and the base portions, a fastener rotatably carried on the rack portion and retaining the standoff to the sports rack crossbar, and an anchor which is adapted to be adjustably receivable in one of a plurality of locations along the inner groove of the rail and which fixedly secures the standoff to the rail.

10 Claims, 3 Drawing Sheets

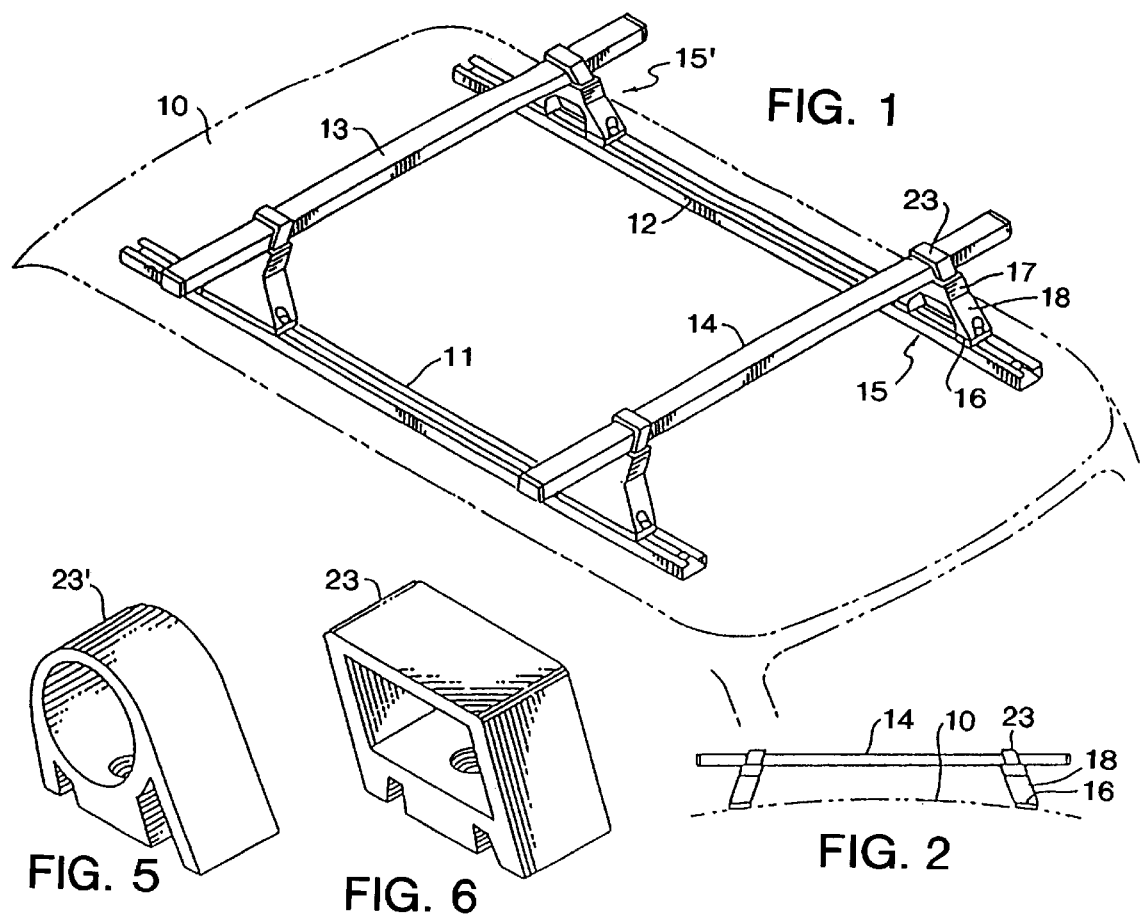
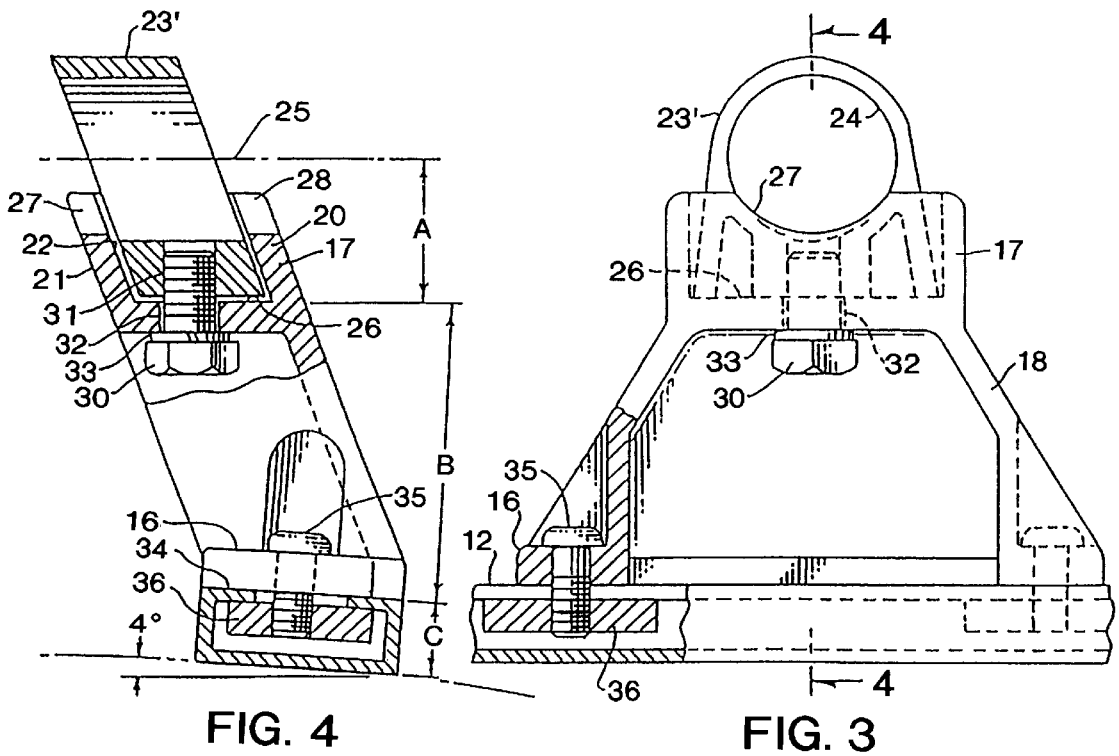

5,810,226

1

STANDOFF ASSEMBLY FOR A AUTOMOBILE SPORTS RACK

This application is a division of application Ser. No. 08/549,067 filed Oct. 27, 1995, now U.S. Pat. No. 3,353, 930, which is a division of application Ser. No. 08/196,566 filed Feb. 14, 1994, now U.S. Pat. No. 5,499,762, which is a division of application Ser. No. 08/045,468 filed Apr. 8, 1993, now U.S. Pat. No. 5,314,104, which is a continuation-in-part of application Ser. No. 07/765,667 filed Sep. 26, 1991, now U.S. Pat. No. 5,201,911.

BACKGROUND OF THE INVENTION

1. Field of the Invention

The present invention relates to the field of load carriers for motor vehicles or the like, and more particularly to a crossbar load carrier with mounting means to support the crossbars on a horizontal plane on the vehicle's existing longitudinal spaced-apart tracks located on a slightly curved vehicle roof surface, or on installed threaded inserts or an adaptor plate conforming with pre-existing threaded inserts.

2. Brief Description of the Prior Art

Slat-type adjustable luggage carriers for automotive vehicles have become very popular. Examples of such article carriers are illustrated in U.S. Pat. Nos. 4,372,469; 4,588,117; 4,516,709; 4,261,496; 4,245,764; 4,239,139; 4,132,335; 4,099,658 and others. The present invention integrates the advantages of the track or slat-type adjustable article carrier with a unique load carrier capable of securing multi-sport rack systems accessories. This load carrier is securely fastened to the existing horizontal tracks or slats by mounting means which conform the rack or carrier crossbars to various vehicles' particular widths and allowing for multiple positions.

Problems and difficulties exist with conventional sports rack or carrier devices, which stem largely from the fact that a variety of racks will not fit onto the roof slats or tracks of a vehicle since the vehicle roof is curved. In some instances, straps with hooked brackets are used in combination with the rain gutter on the vehicle roof to hold down the rack or carrier. This device damages or marks the painted surface. Also, most prior racks or carriers are not theft-proof.

Therefore, a long-standing need has existed to provide a hold-down means mountable on a curved vehicle rooftop in engagement with conventionally installed slats or tracks so that the cargo on the hold-down will be level in order to equally distribute applied load factors. Such a means must be adjustable and adaptable to readily accommodate the cargo to a sloping or curved vehicle roof. Also, such a means may be used on vehicles without roof rack rails by utilizing threaded inserts or with an adaptor plate.

SUMMARY OF THE INVENTION

The present invention is a load carrier for motor vehicles with the mounting means for conforming to various widths and positions, being securely fastened on the roof of a vehicle to the existing longitudinal slats on the surface or to installed threaded inserts or adaptor plate when no slats or rails are available. Two pairs of brackets or mounts are securely bolted to the longitudinal slats or roof which determine the correct width of the load carrier's crossbar and its fore and aft position. Existing slats, when utilized, extend generally longitudinally on the vehicle's horizongal surface and are an integral part of the vehicle.

In one form of the invention, the pair of brackets each include a bracket having a foot portion attachable to the vehicle roof slat and a rack portion attachable to the underside of a load carrier or rack. The foot portion and the rack portion are rigidly held in fixed spaced-apart relationship by a vertical upright portion having its opposite ends integrally formed with the foot and rack portions respectively. The rack portion is provided with a hold-down having either a square, rectangular or circular open-ended channel adapted to insertably receive bars or rods of the load carrier or rack. Securement means are provided for securing the foot portion to the slat and the rack portion to the rack bar or rod inserted through the channel. The hold-down on the rack portion is adjustable so that the cross bar mounting may be made level.

Therefore, it is among the primary objects of the present invention to provide a novel mounting means for a load carrier which will conform to the various widths of different vehicles which have commercially successful slat-type article carriers as an existing integral part of the vehicle.

Another object of the present invention is to provide a novel mounting means provided on the roof of a vehicle that provide a structurally sound base for the load carrier and which will conform to the various widths and positions of anchoring means such as slats on the roof of the vehicle, specially installed adaptors or the like.

Still another object of the present invention is to provide a novel mounting means for a load carrier which will prevent theft of the load carrier and articles placed on the mounting means interconnecting the load carrier with the roof of the vehicle.

A further object resides in providing a mounting means for cargo via crossbars that are level with respect to a curved or sloping roof surface of a motor vehicle.

Another object resides in providing an adjustable means in a cargo mount which includes a floating hold-down member with a screw or bolt fastener for securing the cargo level with respect to a curved or sloping vehicle roof.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front perspective view of the novel mounting means for securing the bars of a load carrier to the spaced-apart slats carried on the curved or sloping roof of a vehicle;

FIG. 2 is a front elevational view of a pair of mounts employed in the mounting means of FIG. 1 illustrating the curved or sloping vehicle roof;

FIG. 3 is an enlarged front elevational view showing the mounting means used in the embodiment of FIG. 1;

FIG. 4 is a transverse cross-sectional view of the mounting means shown in FIG. 3 as taken in the direction of arrows 4—4 thereof;

FIG. 5 is a perspective view of a hold-down member used in the mounting means incorporating the present invention; and FIG. 6 is a view similar to that of FIG. 5 showing another version of a hold-down member for supporting a non-circular cross bar;

DESCRIPTION OF THE PREFERRED EMBODIMENT

Figure 7:
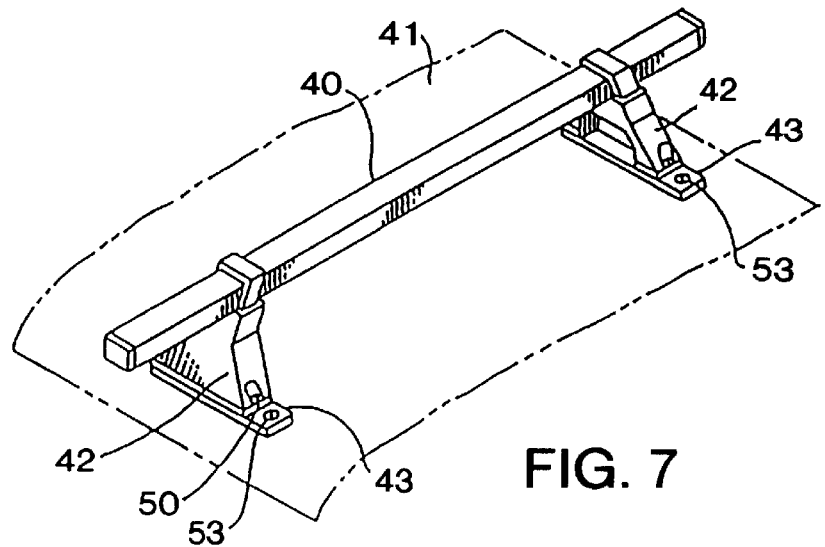
FIG. 7 is a perspective view of another mounting means for securing the bars of a load carrier employing adaptor plates when roof rails or slats are not available.

Referring to FIG. 1, a conventional motor vehicle is indicated by the numeral 10 which includes a pair of parallel tracks, rails or slats 11 and 12, which are conventionally carried on the curved or sloping roof of the vehicle. The tracks, rails or slats are usually secured to the roof by conventional means, such as screws, bolts or the like. The tracks or slats are employed for mounting a conventional rack, carrier, luggage or the like, and in the instance of sports articles, such as bicycles, a conventional rack may be employed which may utilize crossbars 13 and 14 that extend transversely across the vehicle's curved roof so as to have the opposite ends of the crossbars terminate adjacent to the spaced-apart tracks or slats 11 and 12.

In accordance with the present invention, mounting means or stand-offs are arranged in pairs for holding the rack structure crossbars 13 and 14 in fixed securement with the tracks or slats. In general, a front pair and a rear pair of mounting means are provided wherein each pair includes a stand-off or bracket, such as indicated in the general direction of arrow 15 which comprises a foot portion 16 and a rack portion 17 connected together by means of an integral, angular intermediate portion 18. Inasmuch as the mounting means 15 are arranged in front and rear pairs, the rear pair of mounting means is indicated by the numeral 15' while the front pair is indicated by the numeral 15. A hold-down member 23 secures the end of crossbar 14 to the rack portion 17.

Referring now to FIG. 2, it can be seen that the roof 10 of the car is slightly curved as is the normal practice in fabricating motor vehicles. On the other hand, the front crossbar 14 is illustrated level and it is the purpose and intention of the mounting means incorporating the present invention to ensure that the crossbar 14 is substantially level even though the mounting means is carried on a sloping or curved surface.

Referring now in detail to FIGS. 3 and 4, it can be seen that each of the respective mounting means includes a bracket having its rack portion 17 terminating in a yoke with side elements 20 and 21. As shown in FIG. 4, the side elements 20 and 21 are in spaced-apart relationship so as to define a recess, indicated by numeral 22, into which a hold-down member 23' is mounted. It can be seen that the hold-down member 23' includes a circular open-ended passageway 24 having a central longitudinal axis 25 which is parallel with respect to a yoke recess surface 26 constituting the bottom of the recess and separating the side elements 20 and 21 respectively. It is to be particularly noted by the letter A that the central longitudinal axis 25 and the recess surface 26 are parallel with respect to one another. It is also to be noted that the elements 21 and 20 are slotted, as represented by numerals 27 and 28, so that the end of crossbar 14 can be inserted through the passageway and through the slots on the respective elements. Such installation will ensure that the crossbar will lie on the central longitudinal axis of the hold-down member 23' and therefore be parallel with the yoke recess floor or bottom surface 26.

When the end of the round bar 14 has been so inserted through the passageway and slots, a retaining screw or bolt 30 may be rotated through the threaded opening 31 in order to draw the hold-down member 23' towards the bottom surface. Continued rotation will ensure a tightening action of the crossbar against the slots 27 and 28 at which point the turning of fastener 30 ceases. It is to be particularly noted that the fastener 30 passes through an opening 32 in the rack portion 17 and that no engagement occurs other than the compressing of a lock washer 33 against the underside of the foot portion.

FIG. 4 further illustrates by the letter B that the surface 26 is not parallel with a mounting surface 34 on the underside of the foot portion 16. This latter surface engages with the uppermost surface of the track 12 and is held in intimate contact by means of bolt 35 being tightened to draw a lock member 36 into contact with the underside of the track. The lock 36 rides within the elongated slot of the track 12. As stated earlier, the track or slot 12 is a conventional installation placed on roof 10 of the motor vehicle. Therefore, it can be seen that the undersurface of the track 12 and the surface 34 are parallel with respect to one another, as indicated by the letter C. However, it is to be noted that the roof 10 provides approximately a 4 degree offset from the underside of the track 12 with respect to a horizontal plane. This horizontal plane is parallel with the longitudinal central axis 25 of the hold-down member 23' and it is the purpose of the adjustment screw 30 to bring the hold-down member 23' into engaging contact with the crossbar 14 in order to adjust for this 4 degree difference.

Referring now in detail to FIG. 5, it can be seen that the hold-down member 23' is as previously described. However, in order to accommodate a rectangular crossbar, as shown in FIG. 1, the hold-down member may take the form of a square or rectangle as the hold-down member is indicated by numeral 23. The adjustment is identical to that which was previously described with respect to the hold-down member 23'.

It is to be particularly noted that the pair of mounting means for both the front and rear pairs are spaced laterally across the top or roof of the motor vehicle in fixed spaced-apart relationship. When the bars 13 or 14 are inserted into the respective passageways of either hold-down member 23 or hold-down member 23'. accommodation is automatically made for the width or distance between the tracks or slats 11 and 12. Therefore, a variety of bars on mounting racks or load carriers may be accommodated without the necessity for measuring or accounting for precise fit. Furthermore, it is noted that the securement is fixed and that the securement is theft-proof since the complete disassembly of the mounting means would be necessary in order to remove the load carrier or any sports articles that may be carried thereon.

In view of the foregoing, it can be seen that the mounting means of the present invention, whether it takes the form of the brackets shown in FIGS. 5 or 6, provide a novel means for mounting a load carrier or rack crossbars onto the tracks, rails or slats of a conventional vehicle. Inasmuch as the crossbar may be slid through the open-ended passageways or channels on either of the mounting means embodiments, the width of the rack of the width of the slats or tracks may be accommodated. Furthermore, it can be seen that the mounting means of the present invention compensates for a slope or curvature in the roof 10 of the vehicle itself by providing a floating hold-down member, such as represented by numeral 23' in FIG. 4, that tightens upon the end of a crossbar inserted through passageway 24 when the fastening screw or bolt 30 is tightened. The bolt causes the hold-down member to be drawn towards the bottom surface 26 which is parallel to the longitudinal axis of the passageway, as represented by numeral 25.

Figure 8:
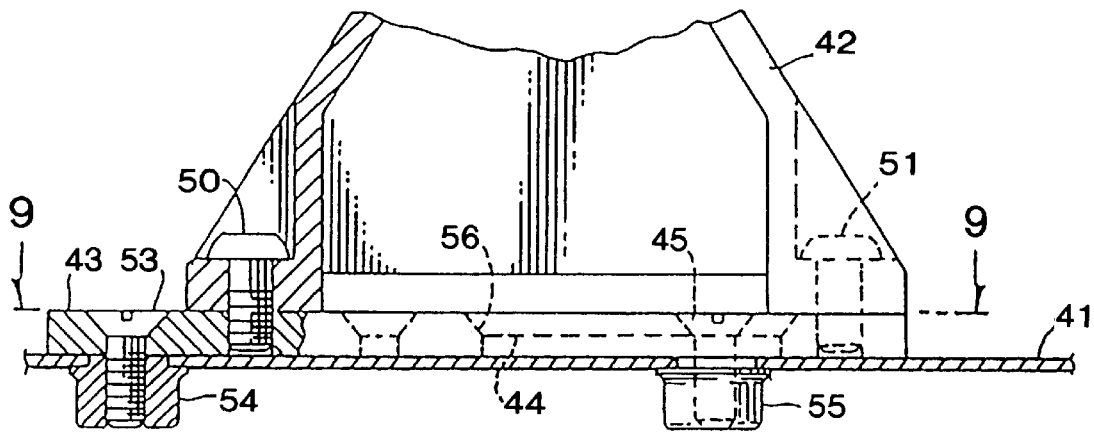
FIG. 8 is a cross-sectional fragmentary view illustrating the adaptor plate used in FIG. 7.
Figure 9:
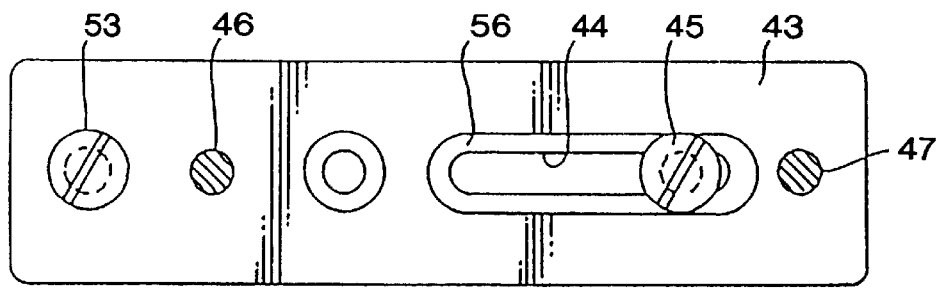
FIG. 9 is a cross-sectional view of the mounting means taken in the direction of arrows 9—9 of FIG. 8.

Referring to FIG. 7, another embodiment of the present invention is illustrated wherein a square crossbar 40 is mounted on auto roof 41 which comprises a hold-down device 42 that is similar to the hold-down device shown in the previous drawing figures. However, it can be seen in FIGS. 7–9 inclusive that the hold-down device is mounted to an anchor plate 43 having an elongated slot 44 for receiving a retaining screw or fastener 45. The anchor plate 43 includes threaded openings 46 and 47 through which the threaded shank of fasteners 50 and 51 can be threadably accommodated. Fasteners 45 and 53 are threadably engageable with retaining studs 54 and 55 that are normally carried on the underside of the roof 41 and the studs can handle fasteners for a track or slat if desired. However, the adaptor or anchor plate 43 of the present invention permits the hold-down devices to be aligned with respect to the holes for receiving the threaded studs, and for this reason, the adaptor plate is provided with the elongated slot 44. It is noted that the slot is countersunk, as indicated by numeral 56, so that the underside of the fastener head 45 will bear against the sloping contour of the slot.

Figure 10:
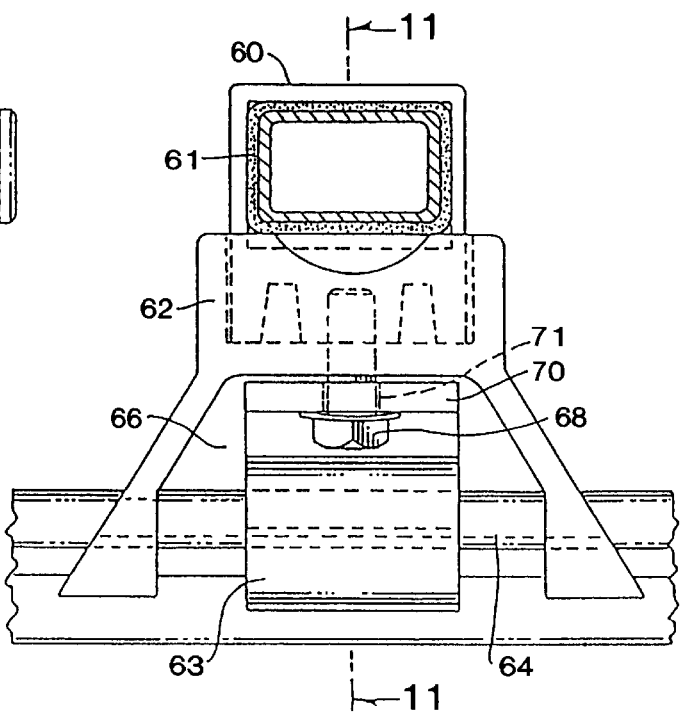
FIG. 10 is a front elevational view of another version of mounting means employed in combination with a roof mounted channel.
Figure 11:
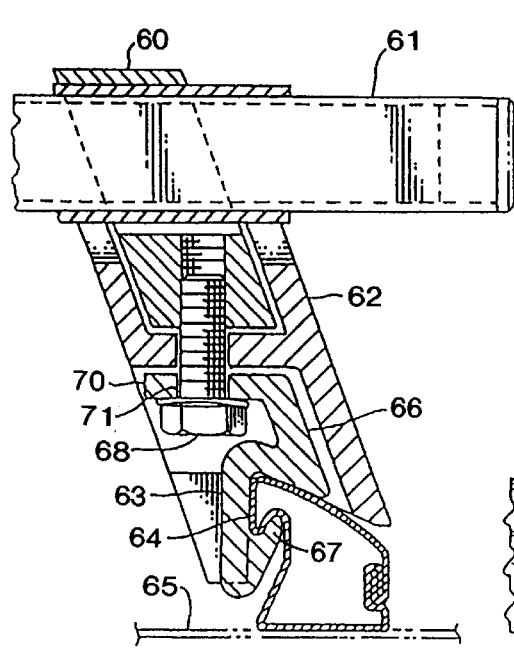
FIG. 11 is a transverse cross-sectional view of the mounting means shown in FIG. 10 as taken in the direction of arrows 11—11 thereof.
Figure 12:
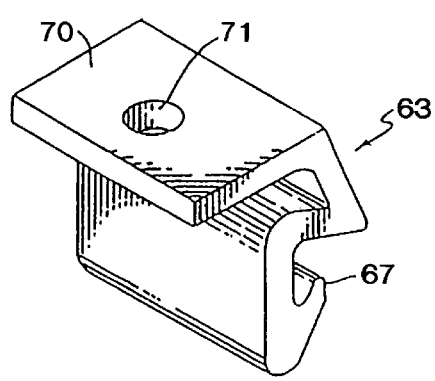
FIG. 12 is a perspective view of a hook employed in the embodiment of FIGS. 10 and 11.

Referring to another embodiment shown in FIGS. 11–12 inclusive, the hold-down member 60 holds crossbar 61 in position in the rack portion 62 by means of a hook member 63 which engages with an undercut groove or lip 64 carried on an anchor or element directly carried on the roof of the car or auto, as identified by number 65. The standoff shown in FIG. 10 includes an enlarged opening 66 in which the hook member 63 is located so that the engaging portion 67 of the hook can be placed under the lip 64. The hook is attached to the rack portion 62 by means of the fastening bolt 68 which also serves to retain the hold-down member 60 in position on the yoke of the rack portion 62 previously described with respect to the other embodiments. In FIG. 12, it can be seen that the hook member 63 includes a flange 70 having a smooth bore or hole 71 through which the threaded shank of the fastener 68 will pass so that the underside of the fastener head, as well as its securement washer, will reside on the underside of the flange 70. The hook portion 67 is offset from the center line of the hole 71 so that access may be had to the bolt from the inside of the device, as shown in FIG. 11. The anchor or plate 64 may be a rain gutter or may be a separate fixture carried on the auto.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A standoff assembly for mounting a sports rack crossbar onto a roof of a vehicle having an elongated rail mounted thereon, said roof having a central longitudinal axis and said rail being provided with an inner groove and at least one inwardly facing flange which is directed toward the central axis of the roof, both of which extend substantially along the length of said rail, the standoff assembly comprising:

a standoff having a base portion, an intermediate portion and a hold-down portion, said hold-down portion having a through hole for loosely receiving a sports rack crossbar;

a fastener rotatably carried on said hold-down portion and adjustably retaining said sports rack crossbar within the hold-down portion; and an anchor which is adapted to be adjustably receivable in one of a plurality of locations along the inner groove of the rail and which fixedly secure said standoff to at least said at least one inwardly facing flange of said rail.

2. A standoff assembly as defined in claim 1, wherein said anchor comprises at least one hook member attached to said base portion by at least one fastener.

3. A standoff assembly according to claim 1, wherein the hold-down portion is separable from the intermediate portion.

4. A standoff assembly for mounting a sports rack crossbar onto a roof of a vehicle having an elongated rail mounted thereon, said roof having a central longitudinal axis and said rail being provided with an inner groove and at least one inwardly facing flange which is directed toward the central axis of the roof, both of which extend substantially along the length of said rail, said standoff assembly comprising:

a standoff comprising a base portion and a rack portion adapted to conform to different roof curvatures in fixed spaced-apart relationship determined by an intermediate portion disposed between said rack and base portions, said rack portion having a through hole for loosely receiving at least one type of sports rack crossbar;

a fastener carried on said rack portion and retaining said rack portion to said sports rack crossbar by biasing the sports rack crossbar against the rack portion; and at least one anchor which is adapted to be adjustably receivable in one of a plurality of locations along the inner groove of the notched rail and which fixedly secures said base portion to at least said at least one inwardly facing flange of said rail.

5. A standoff assembly according to claim 4, wherein the rack portion is separable from the standoff.

6. In a standoff assembly for mounting a sports rack crossbar onto the roof of a vehicle upon which is mounted an elongated rail having an inner groove extending substantially along the length thereof, the improvement comprising:

at least one type of hold-down member for holding at least one type of sports rack crossbar, said hold-down member for loosely holding said sports rack crossbar;

a rack portion having an open receptacle for insertably receiving said hold-down member, said open receptacle having at least one pair of upwardly extending side walls which extend above a portion of the hold-down member;

a fastener rotatably carried on said rack portion and releasably retaining said hold-down member on said rack portion; and at least one anchor which is adapted to be adjustably receivable in one of a plurality of locations along the inner groove of the rail and which fixedly secures said rack portion to the rail.

7. A standoff assembly as defined in claim 6, wherein said at least one anchor comprises a hook member attached to said base portion by at least one fastener, said hook member being insertably receivable into the inner groove of the rail.

8. A standoff assembly for mounting a sports rack crossbar onto a roof of a vehicle wherein said roof has a central longitudinal axis and upon said roof is mounted an elongated rail provided with an inner groove and at least one inwardly facing flange which is directed toward said central axis of said roof both of which extend substantially along the length of said rail, comprising:

a single unitary construction having a base portion and a rack portion, said rack portion having a through hole for loosely receiving a sports crossbar;

a fastener rotatably carried on said rack portion for retaining within the rack portion said sports crossbar; and an anchor which is adapted to fixedly secure said single unitary construction and said sports rack crossbar to said rail, said anchor comprising at least one hook member attached to said base portion and adapted to be adjustably receivable in one of a plurality of locations along the inner groove of the rail and adapted to be fixedly securable to said rail by hooking onto at least the at least one inwardly facing flange.

9. A standoff assembly for mounting a sports rack crossbar onto a curved roof of a vehicle upon which is mounted an elongated rail provided with an inner groove extending substantially along the length thereof, comprising:

a hold-down member for loosely receiving said sports rack crossbar;

a rack portion having an open receptacle for insertably receiving said hold-down member, said open receptacle having a pair of upwardly extending side walls which extend above a portion of said hold-down member;

a fastener rotatably carried on said rack portion and releasably retaining said hold-down member on said rack portion; and an anchor positioned at an underside of said open receptacle and adapted for releasably securing said rack portion to said rail, said anchor comprising at least one hook member adapted to be adjustably receivable in one of a plurality of locations along the inner groove of the rail so as to anchor said rack portion to said rail.

10. A standoff assembly as defined in claim 9, wherein said at least one anchor comprises a hook member attached to said base portion by at least one fastener, said hook member being insertably receivable into the inner groove of the rail.

* * * * *